United States Patent
Wu

(10) Patent No.: US 7,953,995 B2
(45) Date of Patent: May 31, 2011

(54) DATA TRANSMITTING METHOD AND ELECTRONIC DEVICE USING THE SAME

(75) Inventor: Ming-Chin Wu, Taipei (TW)

(73) Assignee: Inventec Corporation, Taipei (TW)

( * ) Notice: Subject to any disclaimer, the term of this patent is extended or adjusted under 35 U.S.C. 154(b) by 544 days.

(21) Appl. No.: 12/155,590

(22) Filed: Jun. 6, 2008

(65) Prior Publication Data
US 2008/0303549 A1    Dec. 11, 2008

(30) Foreign Application Priority Data
Jun. 6, 2007  (TW) .............................. 96120410 A

(51) Int. Cl.
*G06F 1/00* (2006.01)

(52) U.S. Cl. ..................................... 713/300

(58) Field of Classification Search .................. 713/300
See application file for complete search history.

(56) References Cited

U.S. PATENT DOCUMENTS
7,736,541 B2 *  6/2010  Toshioka et al. .............. 252/500
* cited by examiner

*Primary Examiner* — Lincoln Donovan
*Assistant Examiner* — Daniel Rojas
(74) *Attorney, Agent, or Firm* — Bacon & Thomas, PLLC

(57) ABSTRACT

A data transmitting method for transmitting a software version data from a power IC to a controlling IC is provided. Firstly, a request signal is transmitted to a second pin of the power IC from a data pin of the controlling IC. Next, an acknowledge signal is transmitted to the data pin from the second pin. Then, a first pin of the power IC is enabled by a clock pin of the controlled IC. Lastly, the software version data is transmitted to the data pin from the second pin of the power IC.

8 Claims, 3 Drawing Sheets

US 7,953,995 B2

DATA TRANSMITTING METHOD AND ELECTRONIC DEVICE USING THE SAME

This application claims the benefit of Taiwan application Serial No. 96120410, filed Jun. 6, 2007, the subject matter of which is incorporated herein by reference.

BACKGROUND OF THE INVENTION

1. Field of the Invention

The invention relates in general to a data transmitting method and an electronic device using the same, and more particularly to a data transmitting method for multiplexed pins.

2. Description of the Related Art

Along with the advance of technology, various portable electronic devices such as mobile phone and personal digital assistant (PDA) have become indispensable to modern people. To meet people's need, the functions of the electronic devices tend to be more various than ever. Meanwhile, the communication between various electronic elements within an electronic device via general purpose input output (GPIO) pins are also getting more and more frequent. Despite of the great diversity of functions of electronic devices, the conventional electronic elements have only limited number of pins. Thus, while the function of communication between various electronic elements is occupied by other function, electronic elements will not be able to communicate with and transmit data between each other.

SUMMARY OF THE INVENTION

The invention is directed to a data transmitting method and an electronic device using the same. By way of time division, the pin is multiplexed and equipped with multi-functions, hence resolving the problem of insufficient pins.

According to a first aspect of the present invention, a data transmitting method for transmitting a software version data from a power IC to a controlling IC is provided. The data transmitting method includes a following steps of (a) transmitting a request signal from a data pin of a controlling IC to a second pin of a power IC; (b) transmitting an acknowledge signal from the second pin to the data pin; (c) enabling a first pin of the power IC by a clock pin of the controlled IC; (d) transmitting the software version data to the data pin from the second pin of the power IC.

According to a second aspect of the present invention, an electronic device including a controlling IC and a power IC is provided. The controlling IC includes a clock pin and a data pin. The clock pin is used for outputting a synchronous signal. The data pin is used for outputting a request signal to receive a software version data. The power IC includes a first pin and a second pin. The first pin is used for receiving a synchronous signal. The second pin is used for receiving the request signal and outputting the software version data to the data pin. When the data pin outputs the request signal to the second pin, the data pin is switched from an output end to an input end, and the second pin is switched from an output end to an input end. When the clock pin outputs the synchronous signal to enables the first pin, the second pin outputs the software version data to the data pin.

The invention will become apparent from the following detailed description of the preferred but non-limiting embodiments. The following description is made with reference to the accompanying drawings.

DETAILED DESCRIPTION OF THE INVENTION

A data transmitting method and an electronic device using the same are disclosed in the invention. By way of time division, the original function of a pin is switched to data transmission, and after the data is transmitted, the pin is switched back to its original function. The time division method enables the pin to be multiplexed and equipped with multi-functions, hence resolving the problem of the limitation of pin number.

Figure 1:
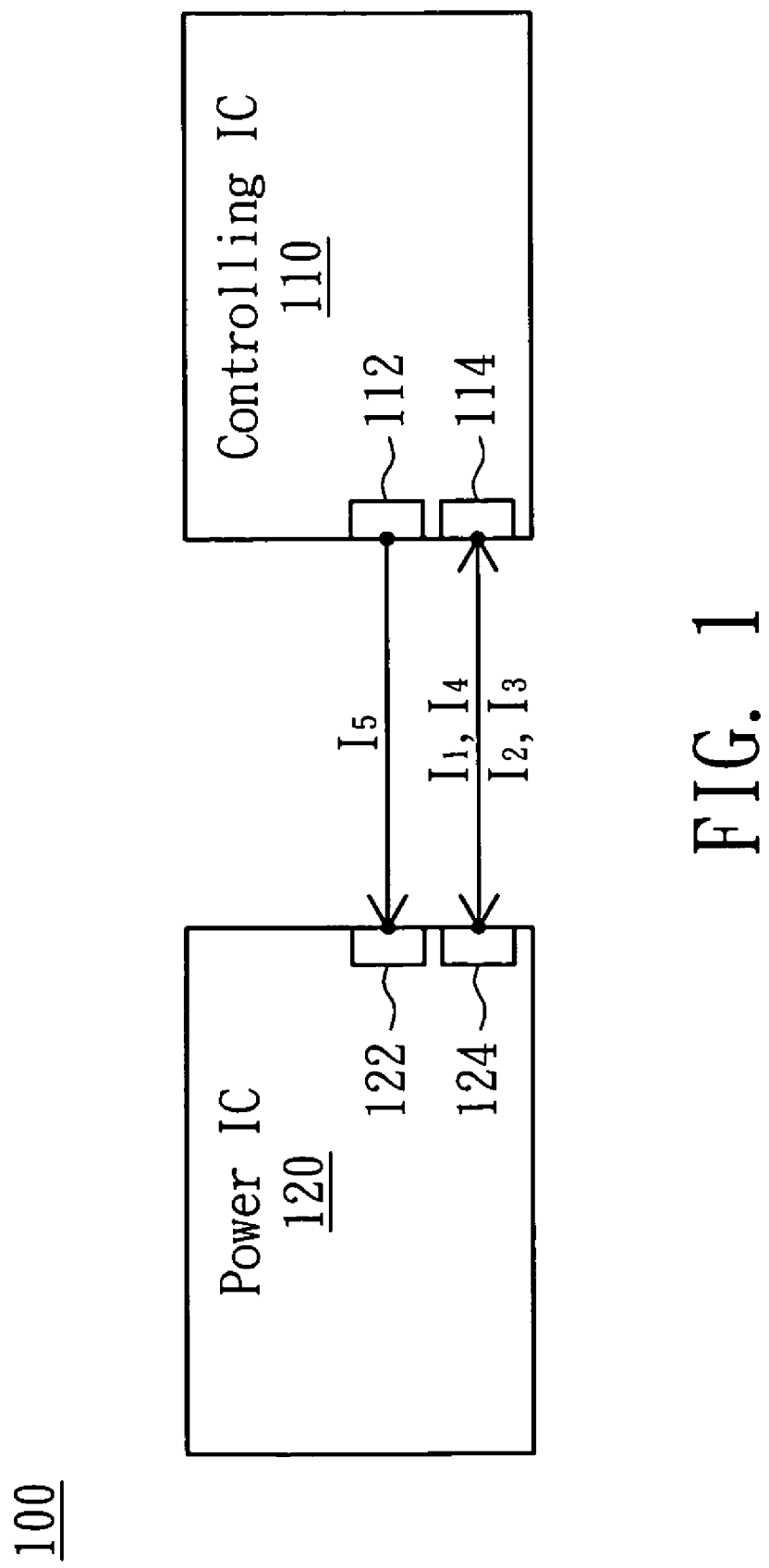
FIG. 1 is a block diagram of an electronic device with data transmission function according to a preferred embodiment of the invention.

Referring to FIG. 1, a block diagram of an electronic device with data transmission function according to a preferred embodiment of the invention is shown. The electronic device 100 includes a controlling IC 110 and a power IC 120. The controlling IC 110 includes a clock pin 112 and a data pin 114. The clock pin 112 is used for outputting a synchronous signal I5. The data pin 114 is used for outputting a request signal I1 to receive a software version data I3. The power IC 120 includes a first pin 122 and a second pin 124. The first pin 122 is used for receiving the synchronous signal I5. The second pin 124 is used for receiving the request signal I1 and outputting a software version data I3 to the data pin 114. When the data pin 114 outputs the request signal I1 to the second pin 124, the data pin 114 is switched to an input end from an output end and the second pin 124 is switched to the output end from the input end. When the clock pin 112 outputs the synchronous signal I5 to enable the first pin 122, the second pin 124 outputs the software version data I3 to the data pin 114. In the present embodiment of the invention, the electronic device is exemplified by a mobile phone, wherein the original function of the clock pin 112 is for controlling turning on/off the power and the original function of the data pin 114 is for transmitting the message of unanswered calls. The data transmitting method is further disclosed in FIG. 2.

Figure 2:
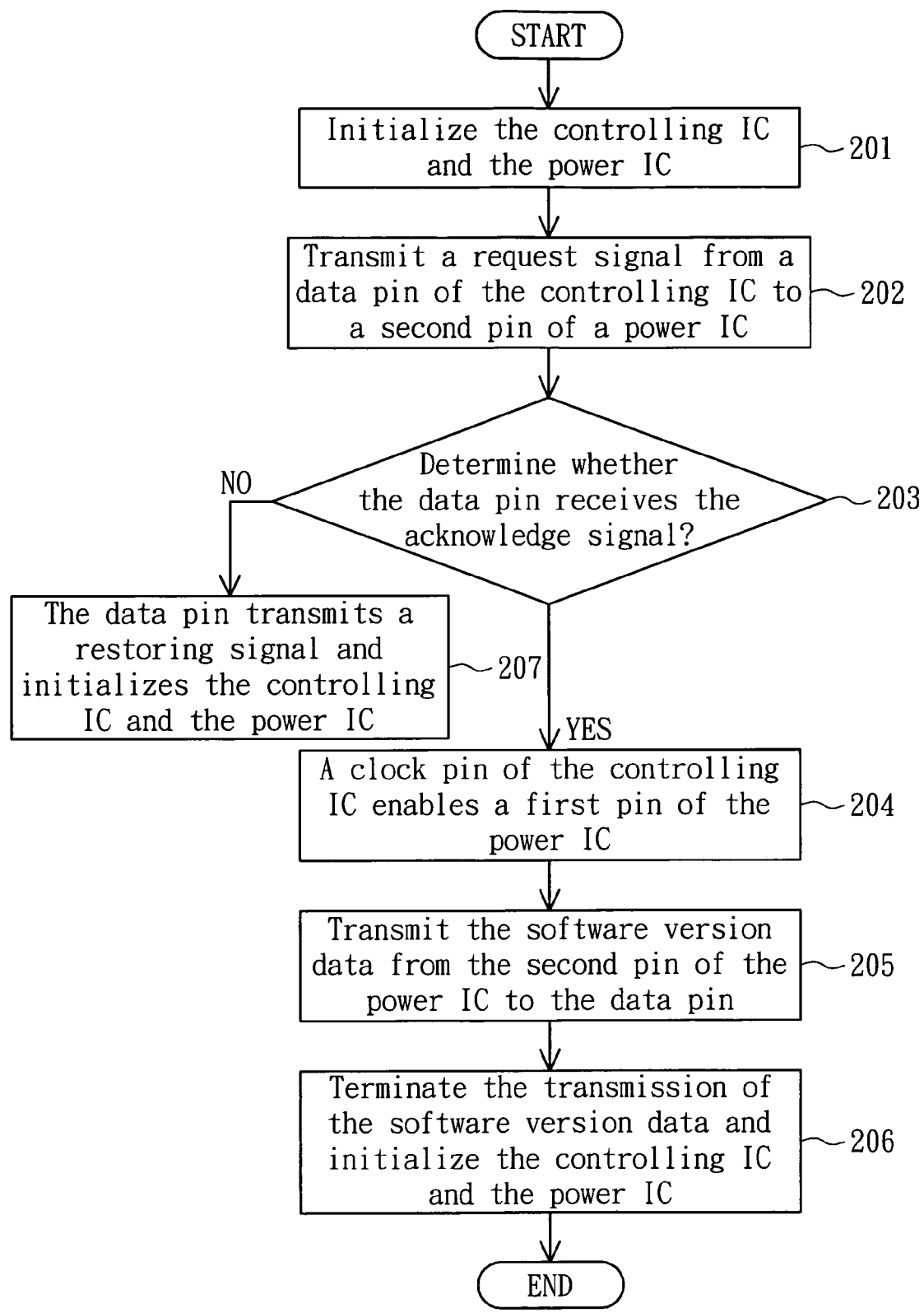
FIG. 2 is a flowchart of a data transmitting method according to a preferred embodiment of the invention.
Figure 3A:
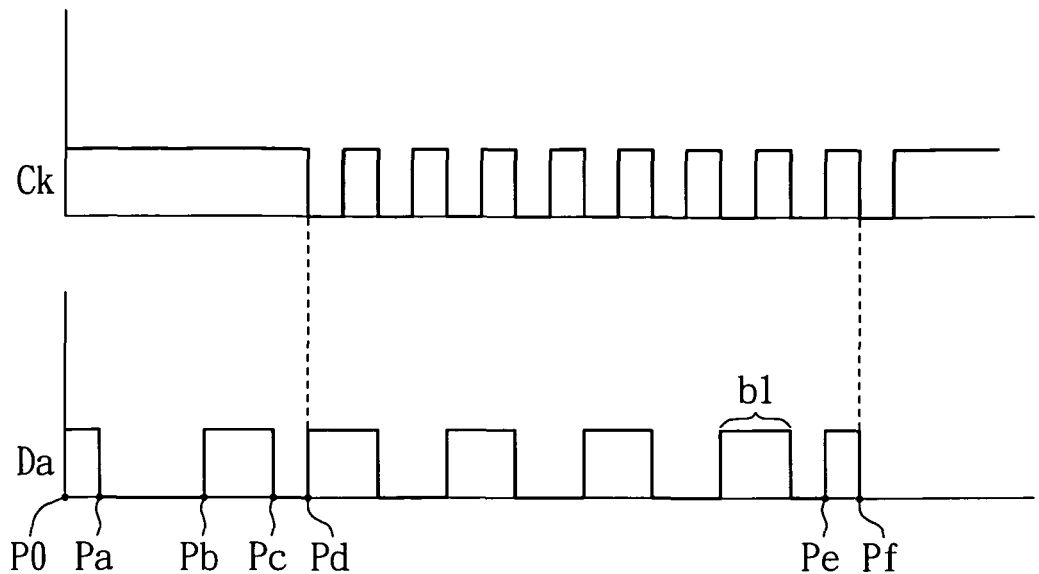
FIG. 3A is a relevant timing diagram according to the data transmitting method of FIG. 2.

FIG. 2 is a flowchart of a data transmitting method according to a preferred embodiment of the invention. Referring to both FIG. 1 and FIG. 3A, FIG. 3A is a relevant timing diagram according to the data transmitting method of FIG. 2. The data transmitting method includes the following step. Firstly, the method begins at step 201 as indicated in FIG. 2. In step 201, the controlling IC 110 and the power IC 120 are initialized. That is, when the data signal Da is at a high level at time point P0, the power is turned on and the controlling IC 110 and the power IC 120 start to be initialized. Firstly, the data pin 114 is set as an output end, and when the data signal Da is at time point Pa, the data pin 114 changes to be at a first level, such as a low level. Next, the second pin 124 is set as an input end and waits for transmitting a request information I1 to the power IC 120 via data pin114.

Next, the method proceeds to step 202. In step 202, the request signal I1 is transmitted to a second pin 124 of the power IC 120 from the data pin 114. Firstly, after the data pin 114 transmits the request signal I1 to the second pin 124 at time point Pb, the controlling IC 110 sets the data pin 114 as an input end from an output end, and the data signal Da changes to be at a second level, such as a high level. Next, after the second pin 124 receives the request information I1, the power IC 120 switches the second pin 124 to the function of data transmitting from the original function of receiving the message of unanswered calls, and sets the second pin 124 to the output end from the input end. Besides, after the data pin 114 is set as an input end, the data pin 114 waits for transmitting an acknowledge signal I2 to the controlling IC 110 via the second pin 124.

Then, the method proceeds to step 203. In step 203, whether the acknowledge signal I2 is received by the data pin 114 is determined. After the data pin 114 transmits the request signal I1 to the second pin 124 at time point Pb, the data pin 114 waits for transmitting the acknowledge signal I2 back to the controlling IC 110 via the second pin 124. If so, the data pin 114 will receive the acknowledge signal I2 transmitted by the second pin 124 at time point Pc, the data signal Da changes to be at the first level, and the method proceeds to step 204. Otherwise, the method proceeds to step 207.

After that, the method proceeds to step 204. In step 204, the clock pin 112 of the controlling IC 110 enables the first pin 122 of the power IC 120. After the data pin 114 of the controlling IC 110 receives the acknowledge signal I2, the clock pin 112 of the controlling IC 110 transmits a synchronous signal I5 to enable the first pin 122 of the power IC 120 at time point Pd. Then, the clock signal Ck changes to the first level from the second level and the data signal Da changes to the second level from the first level.

Afterwards, the method proceeds to step 205. In step 205, the second pin 124 of the power IC 120 transmits the software version data I3 to the data pin 114. In the present embodiment of the invention, the software version data I3 is preferably of hexadecimal (0x55) data transmission format. After the clock pin 112 enables the first pin 122 at time point Pd, the second pin 124 of the power IC 120 starts to transmit the software version data I3 to the data pin 114.

Next, the method proceeds to step 206. In step 206, the transmission of the software version data I3 is terminated, and the controlling IC 110 and the power IC 120 are initialized. After the second pin 124 transmits the last squared wave b1 of the software version data I3, the second pin 124 is set as an input end from an output end at time point Pe, and the data signal Da changes to the second level from the first level. Next, the data pin 114 is set as the output end from the input end at time point Pf, a restoring signal I4 is transmitted to the second pin 124, and the data signal Da changes to the second level from the first level. After the data pin 114 transmits the restoring signal I4 at time point Pf, the clock pin 112 no more transmits the synchronous signal I5, and the clock signal Ck changes to the first level from the second level and maintains at the first level. Besides, after the data pin 114 transmits the restoring signal I4, the data pin 114 terminates the data transmission function and is switched back to its original function, and the clock pin 112 is also switched back to its original function. In the present embodiment of the invention, after the data pin 114 terminates the data transmission function, the function of the data pin 114 is switched back to its original function of transmitting the message of unanswered calls. Besides, the function of the clock pin 112 is also switched back to its original function of controlling the power to be turned on/off.

Figure 3B:
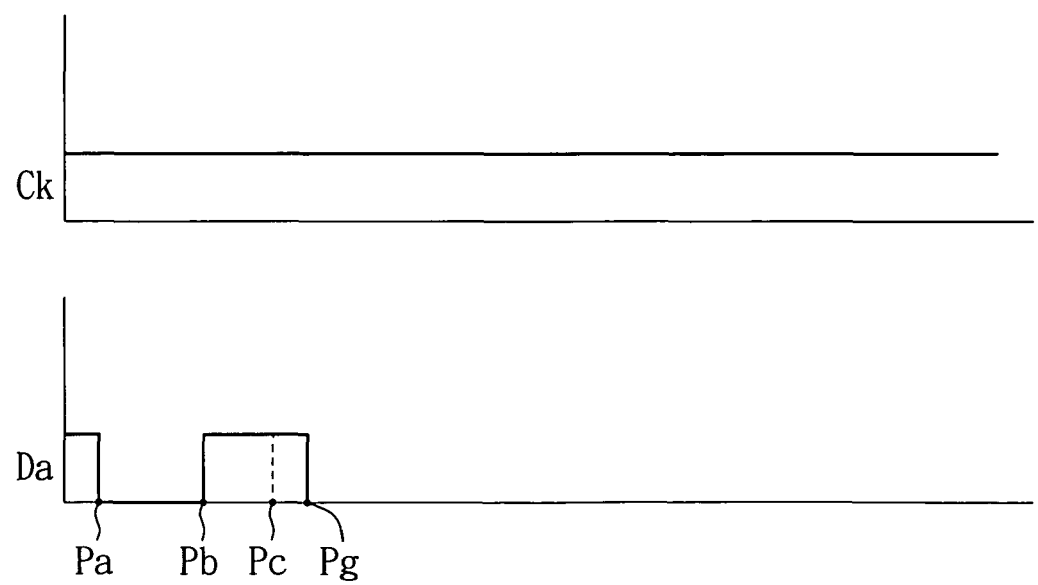
FIG. 3B is a relevant timing diagram according to FIG. 2 when an acknowledge signal is not received by a data pin.

Referring to FIG. 3B, FIG. 3B is a relevant timing diagram according to FIG. 2 when an acknowledge signal is not received by a data pin is shown. In step 203, whether the acknowledge signal I2 is received by the data pin 114 is determined. Otherwise, the method proceeds to step 207.

In step 207, the data pin 114 transmits a restoring signal I4, and initializes the controlling IC 110 and the power IC 120. If the acknowledge signal I2 is not received by the data pin 114 at time point Pc, the controlling IC 110 sets the data pin 114 as an output end from an input end, and transmits a restoring signal I4 at time point Pg. After the data pin 114 transmits the restoring signal I4, the data signal Da changes to the first level from the second level and maintains at the first level. Besides, in the absence of data transmission, the clock signal Ck always maintains at the second level. After the data pin 114 transmits the restoring signal I4, the second pin 124 is set as the input end from the output end, and the functions of both the data pin 114 and the clock pin 112 are switched back to their original functions from the data transmission function.

In the above embodiments of the invention, the first level is a low level and the second level is a high level. However, in practical application, the above levels can be reversed to fit actual needs.

According to the data transmitting method and the electronic device using the same disclosed in the above embodiments of the invention, the pin is switched to data transmission function from original function by way of time division. The time division method enables the pin to be multiplexed and equipped with multi-functions, hence resolving the problem of the limitation of pin number.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data transmitting method for transmitting a software version data from a power IC to a controlling IC, the data transmitting method comprising:
   (a) transmitting a request signal from a data pin of the controlling IC to a second pin of a power IC;
   (b) transmitting an acknowledge signal from the second pin to the data pin;
   (c) enabling a first pin of the power IC by a clock pin of the controlled IC; and
   (d) transmitting the software version data from the second pin of the power IC to the data pin.

2. The data transmitting method according to claim 1, wherein prior to the step (a), the method further comprises:
   (a1) initializing the controlling IC and the power IC.

3. The data transmitting method according to claim 2, wherein the step (a1) comprises:
   (a2) setting the data pin as an output end; and
   (a3) setting the second pin as an input end.

4. The data transmitting method according to claim 1, further comprising:
   (e) initializing the controlling IC and the power IC when the transmission of the software version data is terminated.

5. The data transmitting method according to claim 4, wherein the step (e) comprises:
   (e1) terminating the transmission of the software version data;
   (e2) setting the second pin as an input end;
   (e3) setting the data pin as an output end and transmitting a restoring signal; and
   (e4) initializing the controlling IC and the power IC, wherein the clock pin maintains at a first level, and the data pin maintains at a second level.

6. The data transmitting method according to claim 1, wherein after the step (a) but before the step (b), the method further comprises:
   (f) confirming whether the data pin receives the acknowledge signal: if not, the data pin transmits a restoring signal and initializes the controlling IC and the power IC.

7. The data transmitting method according to claim 1, wherein the step (b) comprises:
   (b1) receiving the request signal by the second pin;
   (b2) setting the data pin as an input end; and
   (b3) setting the second pin as an output end and transmitting an acknowledge signal.

8. An electronic device, comprising:
   a controlling IC, comprising:
      a clock pin for outputting a synchronous signal, and
      a data pin for outputting a request signal for receiving a software version data; and
   a power IC, comprising:
      a first pin for receiving the synchronous signal; and
      a second pin for receiving the request signal and outputting the software version data to the data pin;
   wherein, when the data pin outputs the request signal to the second pin, the data pin is switched to an input end from an output end and the second pin is switched to the output end from the input end, and when the clock pin outputs the synchronous signal to enable the first pin, the second pin outputs the software version data to the data pin.

* * * * *